United States Patent
Scott et al.

(10) Patent No.: US 11,376,621 B2
(45) Date of Patent: Jul. 5, 2022

(54) SPRINKLER ASSEMBLY HAVING COILED WEIGHT

(71) Applicant: Nelson Irrigation Corporation, Walla Walla, WA (US)

(72) Inventors: Sean M. Scott, Walla Walla, WA (US); Riley D. Greenwood, Walla Walla, WA (US); Craig B. Nelson, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 219 days.

(21) Appl. No.: 15/953,728

(22) Filed: Apr. 16, 2018

(65) Prior Publication Data

US 2019/0314850 A1   Oct. 17, 2019

(51) Int. Cl.
*B05B 15/622* (2018.01)
*B05B 15/62* (2018.01)
*A01G 25/00* (2006.01)
*A01G 25/09* (2006.01)

(52) U.S. Cl.
CPC ............ *B05B 15/622* (2018.02); *A01G 25/00* (2013.01); *A01G 25/09* (2013.01); *B05B 15/62* (2018.02)

(58) Field of Classification Search
CPC .............................. B05B 15/622; A01G 25/00
See application file for complete search history.

(56) References Cited

U.S. PATENT DOCUMENTS

| | | | | |
|---|---|---|---|---|
| 2,166,448 | A | * | 7/1939 | Schuknecht ............ F16L 35/00 285/116 |
| 4,676,438 | A | * | 6/1987 | Sesser .................. A01G 25/092 239/391 |
| 6,382,525 | B1 | | 5/2002 | Santiesteban et al. |
| 6,554,233 | B1 | | 4/2003 | Ungerecht |
| 6,808,135 | B1 | | 10/2004 | Landry |
| 6,997,406 | B2 | | 2/2006 | Nelson et al. |
| 7,677,475 | B2 | | 3/2010 | Lawyer |
| 7,942,345 | B2 | | 5/2011 | Sesser et al. |
| 8,028,932 | B2 | | 10/2011 | Sesser et al. |
| 8,352,090 | B2 | | 1/2013 | Drechsel |
| 9,144,192 | B2 | * | 9/2015 | Gednalske .......... A01M 7/0064 |
| 10,900,532 | B2 | | 1/2021 | Macchietto et al. |
| 2012/0227838 | A1 | * | 9/2012 | Ungerecht ............. F16K 1/123 137/528 |

* cited by examiner

*Primary Examiner* — Jason J Boeckmann (57) ABSTRACT

A weighted inverted sprinkler assembly adapted for use with a drop hose of an irrigation system is disclosed. The assembly comprises a coiled weight formed from a coiled wire, a sprinkler fluidly associated with the drop hose, and a coiled weight support structure. A pressure regulator may be provided in fluid associated with the irrigation drop hose and the sprinkler. The coiled weight has a shape that is selected for use with a particular sprinkler assembly. The shape may be an elongated shape for use with an elongated coiled weight support structure, a beehive shape for use with a pressure regulator having a collar to support the coiled weight, and a pear shape for use with a pressure regulator having a flared housing. The coiled weight is preferably formed from a single coiled wire although two or more weights may be used in combination in a given application.

12 Claims, 11 Drawing Sheets

SPRINKLER ASSEMBLY HAVING COILED WEIGHT

TECHNICAL FIELD

The disclosed inventive concept relates generally to a water emitting device such as an irrigation sprinkler. More particularly, the disclosed inventive concept relates to an irrigation sprinkler assembly having a weight attached thereto. The weight is a coiled weight and may be any of a variety of shapes, including having an elongated shape, a beehive shape, and a pear shape.

BACKGROUND OF THE INVENTION

The conventional sprinkler assembly used in the agricultural setting includes a water input line, a pressure regulator, and a water distribution feature which may be, for example, a rotary sprinkler including a rotary plate. The rotary plate includes a surface profile configured so as to distribute the pressurized, regulated water according to a predetermined pattern.

Most sprinkler assemblies for agricultural use are of one of two types. The first type is an upright type and the second type is an inverted or suspended type. Both types may be attached to water distributing pipelines or booms found in center pivot irrigation systems or linear move irrigation systems. The water distributing pipelines are typically attached to mobile carriages having wheels.

Both sprinkler types offer certain advantages when employed in a particular irrigation system. The inverted sprinkler assembly includes a drop pipe or hose that is connected at its water inlet end to the water distributing pipeline or water manifold and is connected at its water outlet end to a pressure regulator. This type of arrangement allows the installer to readily adapt the length of the drop hose to a specific height from the ground. The drop hose is often composed of an elastomeric material that may be easily cut.

While offering a high degree of versatility and adaptability, the inverted sprinkler assembly according to known technology has certain drawbacks. The same features that make use of the drop hose attractive, that is, its low cost, resistance to material breakdown, and ease of cutting, also allow the pressure regulator and the water distribution feature of the inverted sprinkler assembly to move or sway from their desired fixed vertical position to a position that is off axis. This movement may be the result of the unpredictable movement of ambient air or may be the result of the intentional movement of the irrigation system during operation. It is common today for the pressure regulator and the water distribution feature to be substantially or entirely composed of a relatively lightweight polymerized material so as to reduce material and production costs while preventing component rust which might otherwise occur if some or both of these components were made of a metal. Accordingly, the weight of the conventional inverted sprinkler element does little to restrict movement of the inverted sprinkler assembly.

In an effort to stabilize the inverted sprinkler assembly relative to the water distributing pipeline, weights have been fitted to the sprinkler assembly. Examples of such weights are illustrated in U.S. Pat. No. 6,554,233, issued on Apr. 29, 2003, for HOSE CLAMP WEIGHT and U.S. Pat. No. 6,997,406, issued on Feb. 14, 2006, for HOSE WEIGHT WITH BALLAST, both assigned to the assignee of the present disclosed inventive concept. Both references teach a multi-pieced weight arrangement for use with an inverted sprinkler assembly.

While the weight arrangement set forth in these patents provides advancement in the state of the art, as in so many areas of vehicle technology, there is always room for improvement related to the design of weights incorporated into an inverted sprinkler assembly when used in irrigation systems in an effort to restrict movement by stabilizing the sprinkler assembly.

SUMMARY OF THE INVENTION

The disclosed inventive concept provides a weighted inverted sprinkler assembly and a weight for such an assembly that provides a practical and cost-effective solution to the challenges facing sprinkler designers. The weighted inverted sprinkler assembly of the disclosed inventive concept is adapted for use with an irrigation drop hose. The assembly comprises a coiled weight formed from a coiled wire that may be adapted for use with a broad variety of water emitting devices. For example, the coiled weight may be fitted to a pressure regulator fluidly associated with the irrigation drop hose, a sprinkler fluidly associated with the pressure regulator, and a coiled weight support structure operatively associated with the pressure regulator. As a further example, the coiled weight may be used on a water emitting device that does not utilize a pressure regulator.

The coiled weight has a shape that is selected for use with a particular sprinkler assembly. The shape may be an elongated shape, a beehive shape, or a pear shape. Other shapes of the coiled weight or a combination of these shapes may be adopted. For example, the coiled weight support structure may be an elongated tubular structure that is attached to the pressure regulator. In this case, the coiled weight is elongated and is supported by both a series of axial ribs and an annular coiled weight supporting shoulder radially formed on the coiled weight structure.

As a further example of the disclosed inventive concept, the coiled weight support structure may be formed as part of an upper collar of the pressure regulator. In this case, the coiled weight has a beehive shape so as to accommodate and fit substantially around the pressure regulator. The upper collar includes a plurality of spaced apart coiled weight support flanges.

In yet another example of the disclosed inventive concept, the pressure regulator may include a flared housing having a flared shape. In this case, the coiled weight also has a pear shape so as to substantially conform to the shape of the flared housing.

In a further example of the disclosed inventive concept, the coiled weight may be used on a water emitting device that does not include a pressure regulator. In such a case, the coiled weight may rest against a hose clamp or collar, a sprinkler, or another fitting.

The coiled weight of the disclosed inventive concept may be used singly or in combination with one or more additional weights. For example, the installer may be provided with a series of elongated weight segments with each segment having a given weight. A combination of two or more elongated weight segments may be selected for use in a given application.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

The accompanying figures show various related interpretations of the disclosed inventive concept which provide a coiled weight with an inverted sprinkler assembly. It is to be understood that the coiled weight of the disclosed inventive concept may also be adapted for use with any assembly having a flexible, suspended, and elongated component requiring stabilization.

Figure 3:
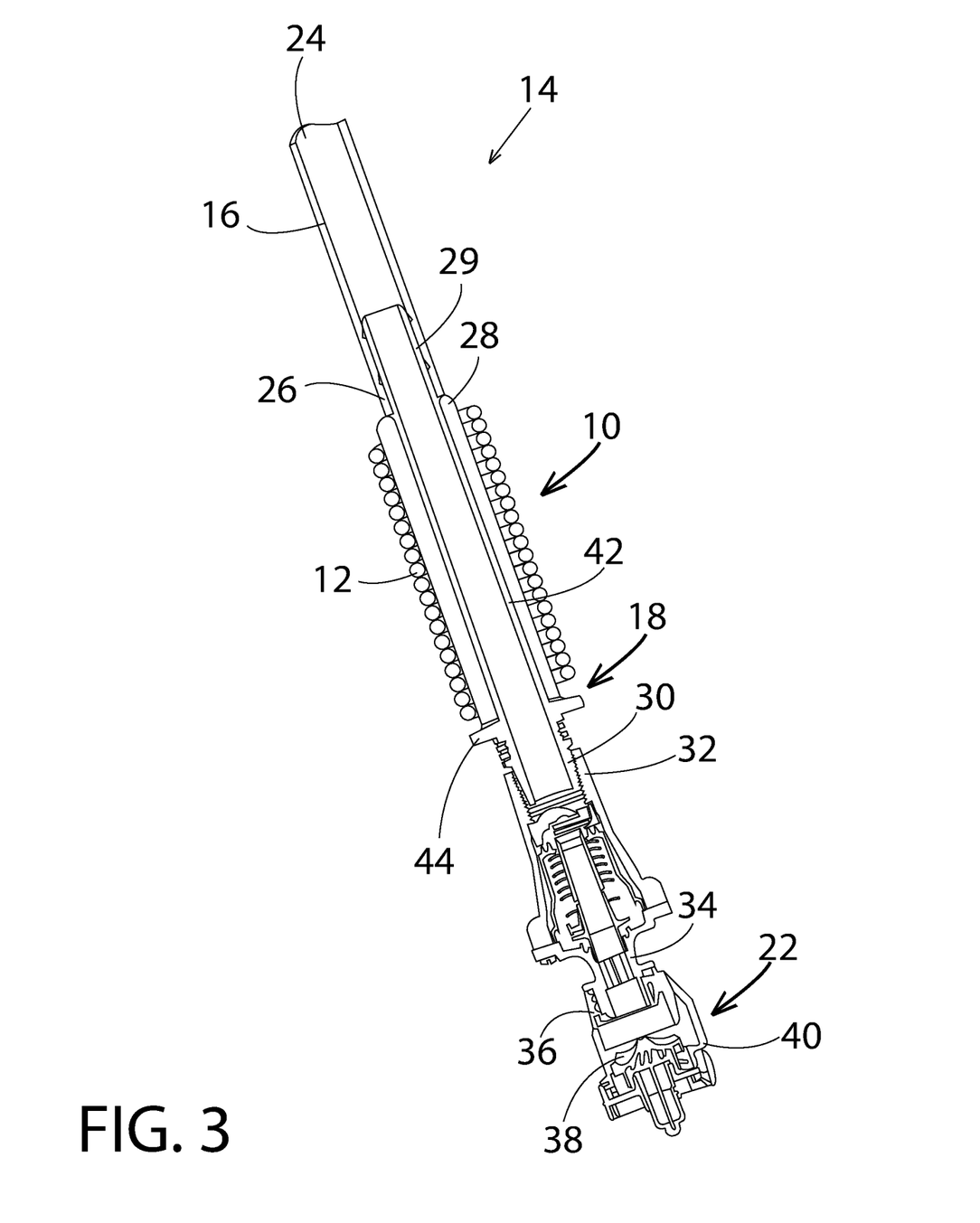
FIG. 3 is a view of the inverted sprinkler assembly fitted with the elongated coiled weight shown in FIG. 2 but illustrated in section.
Figure 4:
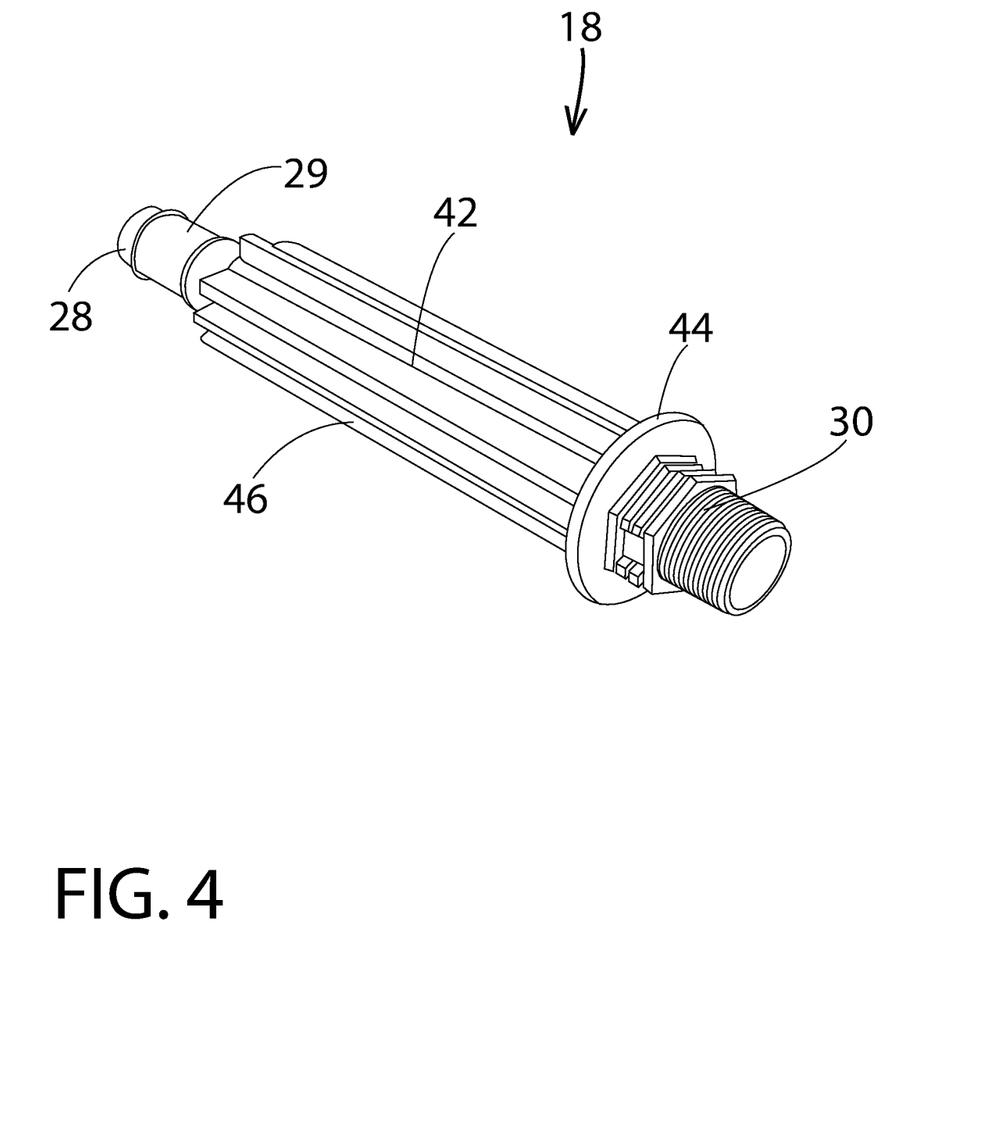
FIG. 4 is a perspective view of the weight holder for holding the elongated weight of FIG. 1 for use in the inverted sprinkler assembly of FIGS. 2 and 3.
Figure 5:
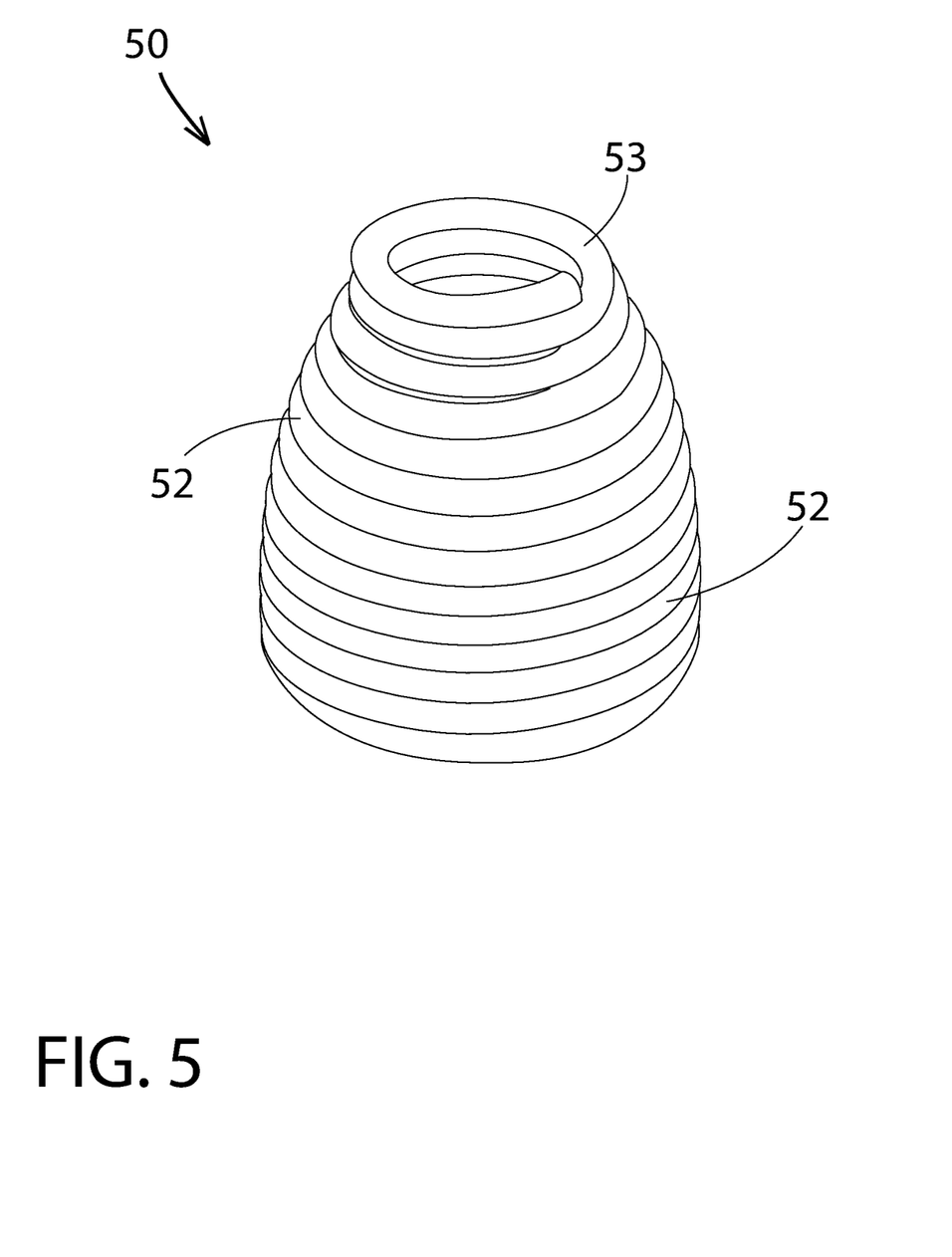
FIG. 5 is a perspective view of a beehive-shaped coiled weight with an inverted sprinkler assembly.
Figure 6:
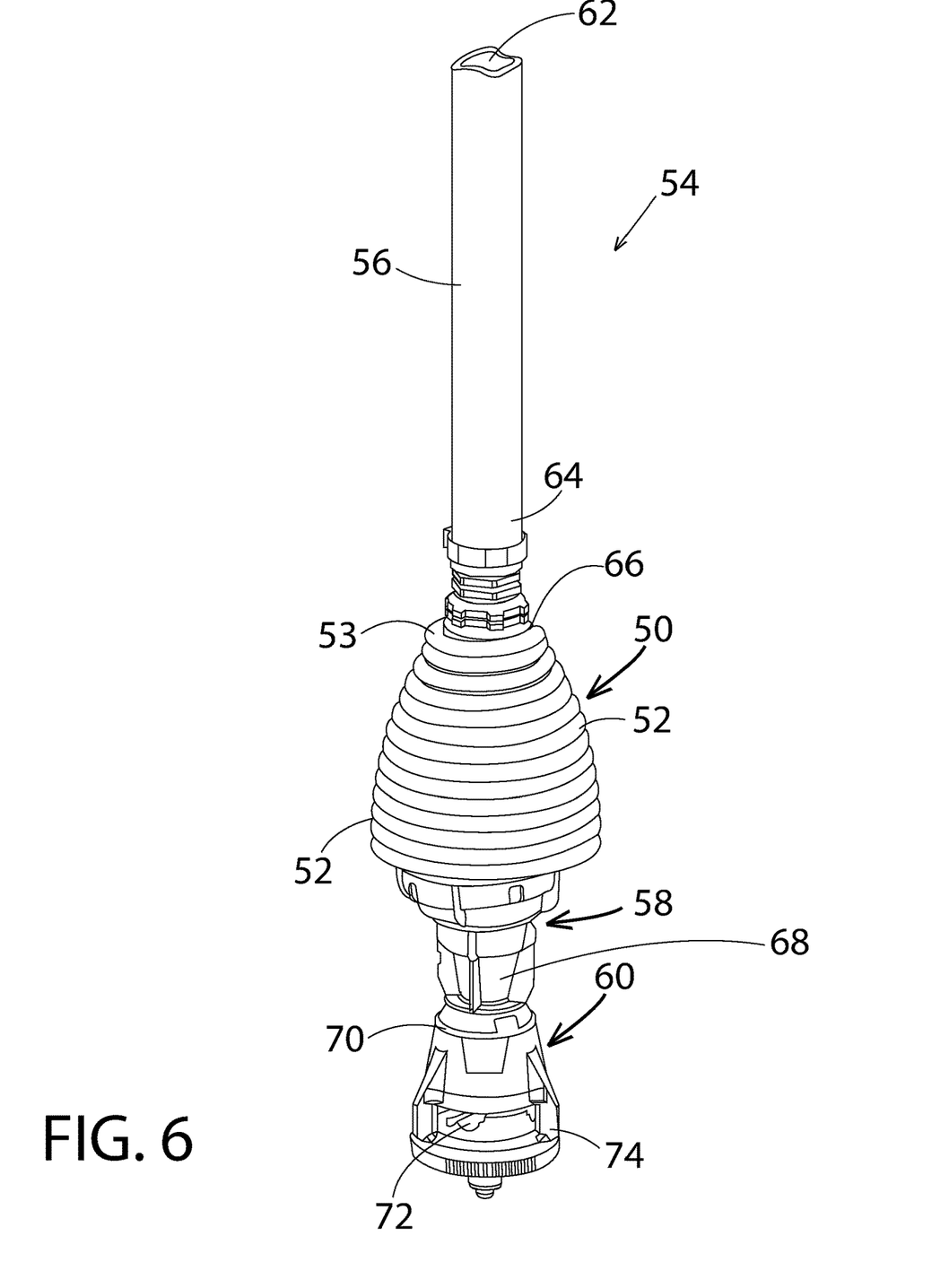
FIG. 6 is a side elevational view of an inverted sprinkler assembly fitted with the beehive-shaped coiled weight of FIG. 5.
Figure 7:
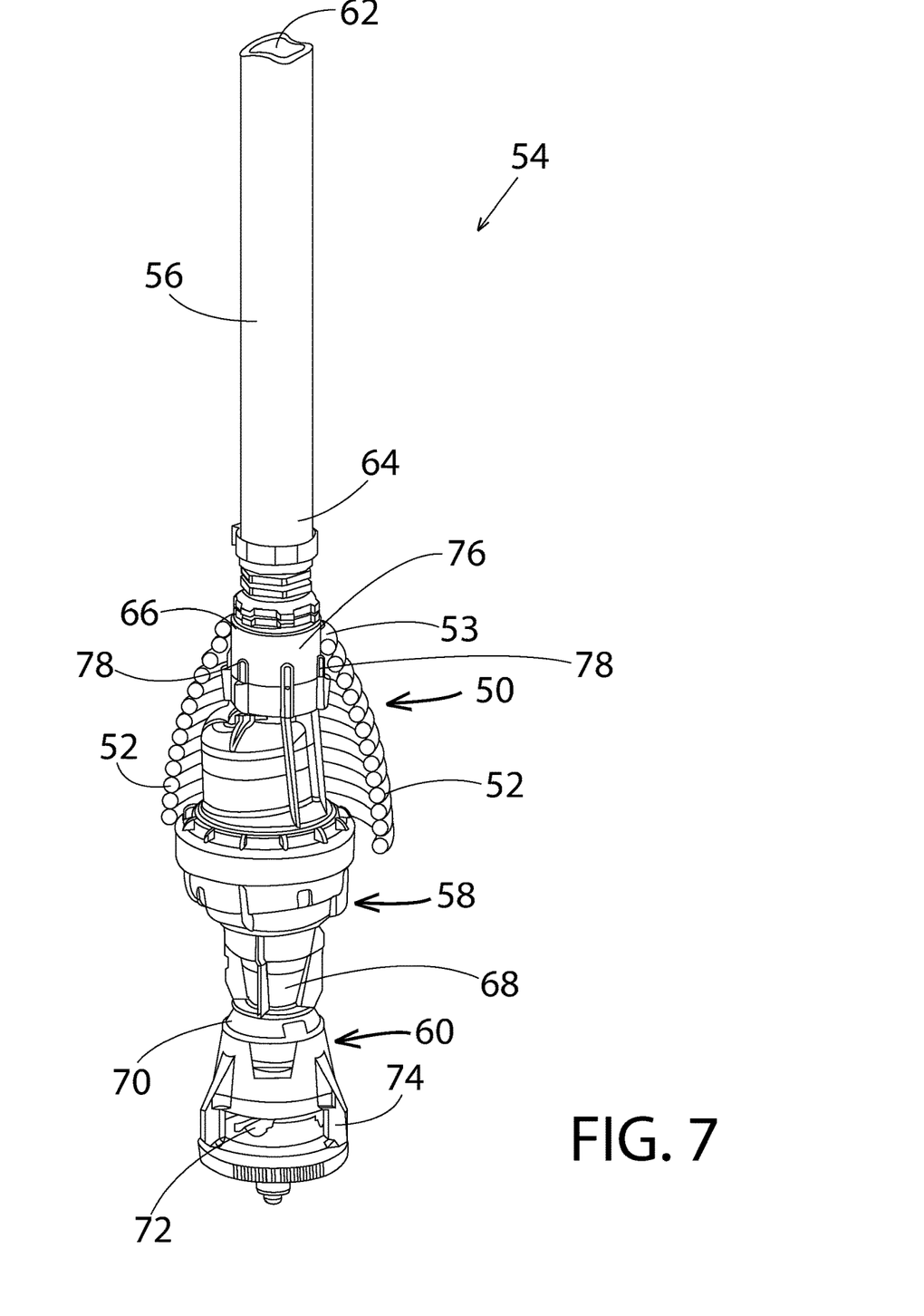
FIG. 7 is a view of the inverted sprinkler assembly fitted with the beehive-shaped coiled weight shown in FIG. 6 but illustrated in section.
Figure 8:
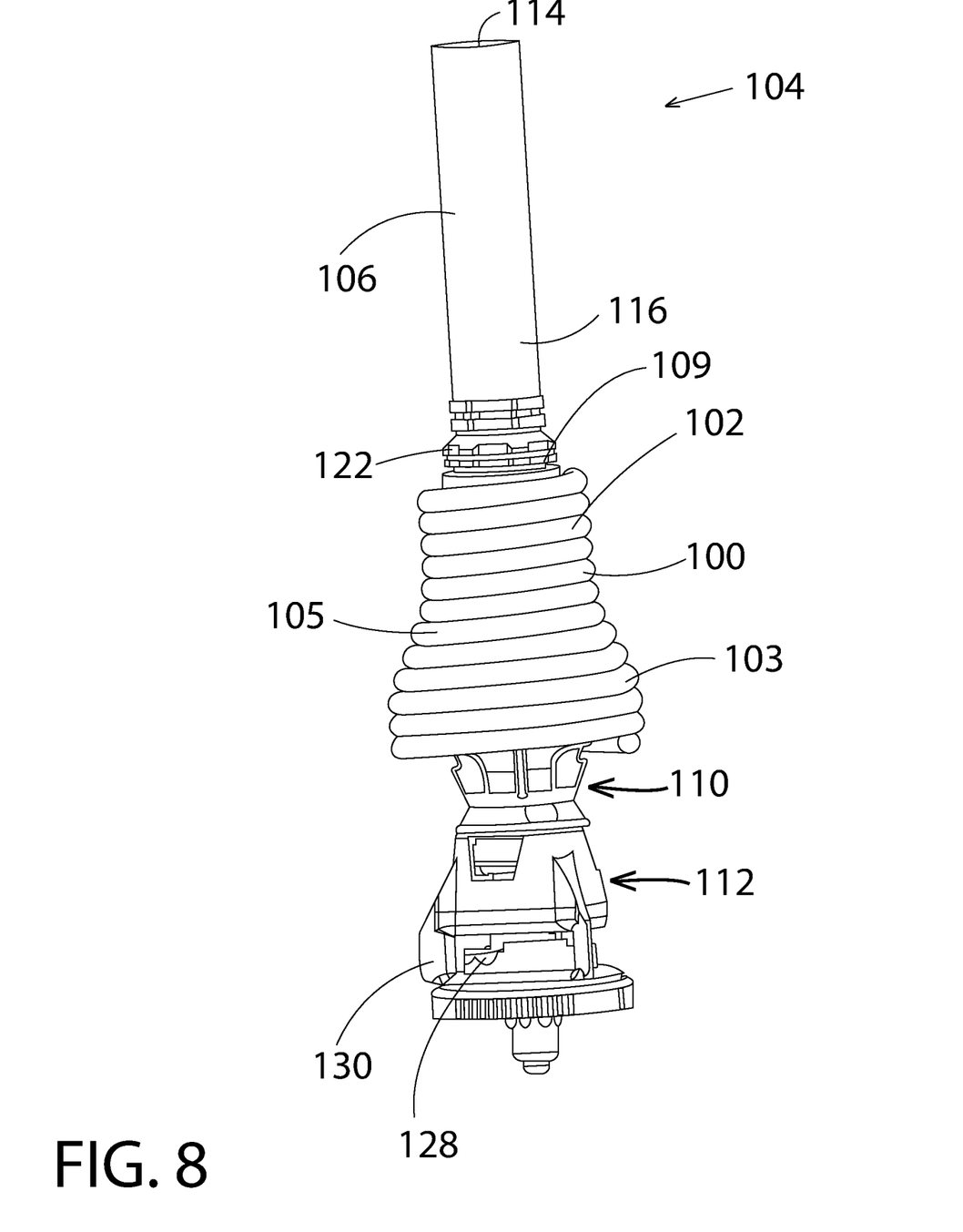
FIG. 8 is a side elevational view of an inverted sprinkler assembly fitted with a pear-shaped coiled weight.
Figure 9:
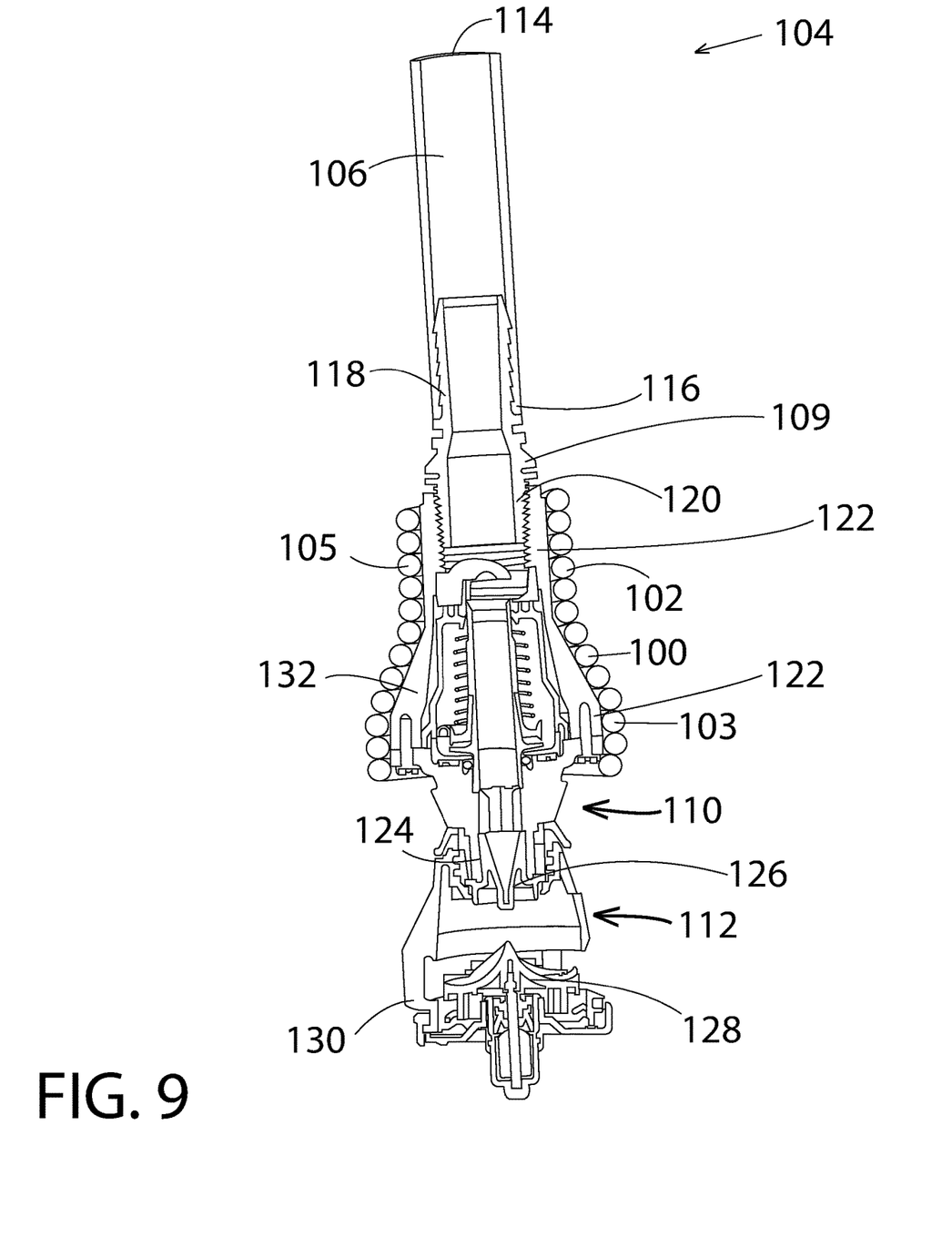
FIG. 9 is a view of the inverted sprinkler assembly fitted with the pear-shaped coiled weight shown in FIG. 8 but illustrated in section.
Figure 10:
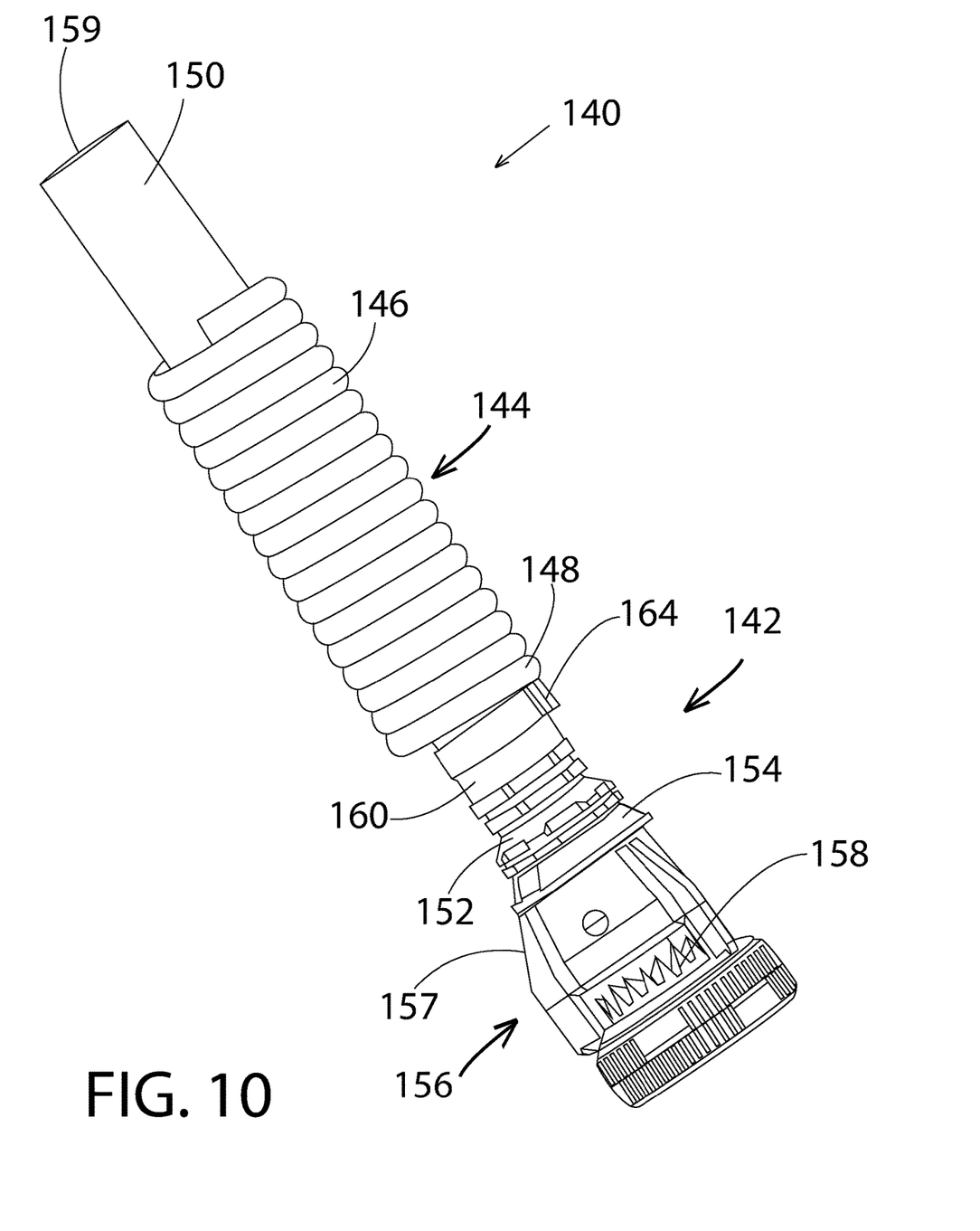
FIG. 10 is a side elevational view of an inverted sprinkler assembly fitted with an elongated coiled weight.
Figure 11:
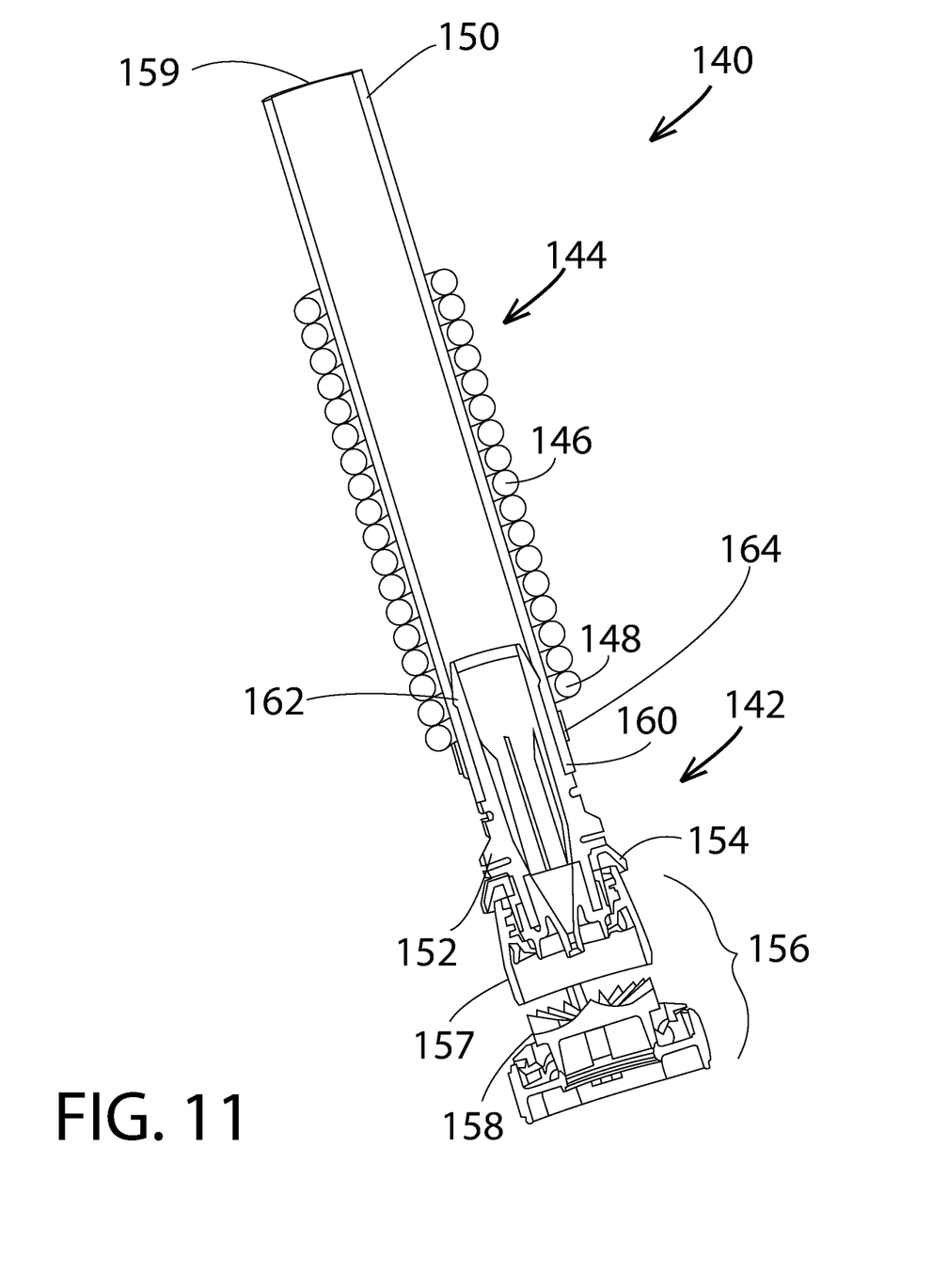
FIG. 11 is a view of the inverted sprinkler assembly fitted with the elongated coiled weight shown in FIG. 10 but illustrated in section.

In general, the coiled weight with an inverted sprinkler assembly having an elongated shape is illustrated in FIGS. 1 through 4, the coiled weight for use with an inverted sprinkler assembly having a beehive shape is illustrated in FIGS. 5 through 7, and the coiled weight with an inverted sprinkler assembly having a pear shape is illustrated in FIGS. 8 and 9, and a variant of an inverted sprinkler assembly having an elongated shape is shown in FIGS. 10 and 11. It is to be understood that the concepts illustrated in the accompanying figures and discussed in relation thereto are not intended as being limiting as certain variations, such as the overall shapes and sizes, may be made without deviating from the disclosed inventive concept. Furthermore, the number of coil windings and thickness of the wire making up the coiled weight may be varied as needed to suit a particular purpose.

The disclosed inventive concept solves the limitations of known weighted inverted sprinkler assemblies by providing a coiled weight that is readily adaptable to different sprinkler assemblies, is highly tunable for a given application, and is not costly to manufacture or install.

Figure 1:
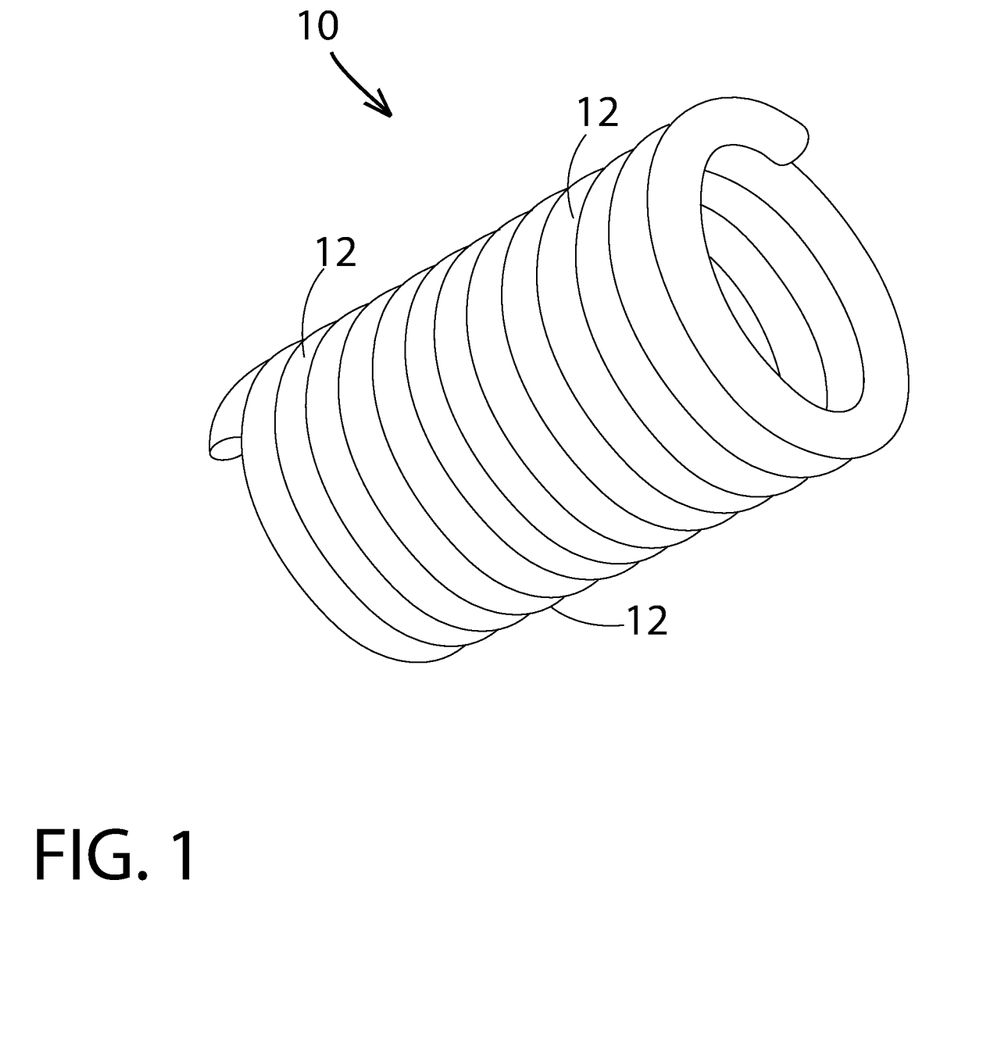
FIG. 1 is a perspective view of an elongated coiled weight with an inverted sprinkler assembly.

Referring to FIGS. 1 through 4, an elongated coiled weight according to the disclosed inventive concept is illustrated in isolation and application in conjunction with an inverted sprinkler assembly. As illustrated in FIG. 1, an elongated coiled weight 10 is shown in perspective view. The elongated coiled weight 10 includes a plurality of individual windings 12. The windings—preferably, but not absolutely—have a constant diameter from one end of the elongated coiled weight 10 to the other. A greater or lesser number of windings 12 may be provided. In addition, the thickness and shape of the wire that is coiled into the shape of the elongated coiled weight 10 may be other than that shown. For example, the wire may have the shape of an oval or a quadrilateral in cross section. The elongated coiled weight 10 may be composed of any of a variety of materials including, but not limited to steel or a relatively heavy rigid plastic. The elongated coiled weight 10 may be uncoated or may be coated with, for example, paint or a powder coat.

Valuable features of the disclosed inventive concept include both versatility and tunability. Variables such as historically typical wind velocity in a given area of application may be taken into consideration when determining the length, type, and weight of the coiled weight to be used. In addition, more than a single elongated coiled weight 10 may be used. For example, by designating a standard weight such as 100.0 g to a single elongated coiled weight 10, the installer would immediately know that two elongated coiled weights would add 200.0 g to the inverted sprinkler assembly. Smaller or larger segments of coiled weights could form components of a standard installer's weight kit with the possibility of each segment being color coded to thereby specify a specific weight.

Figure 2:
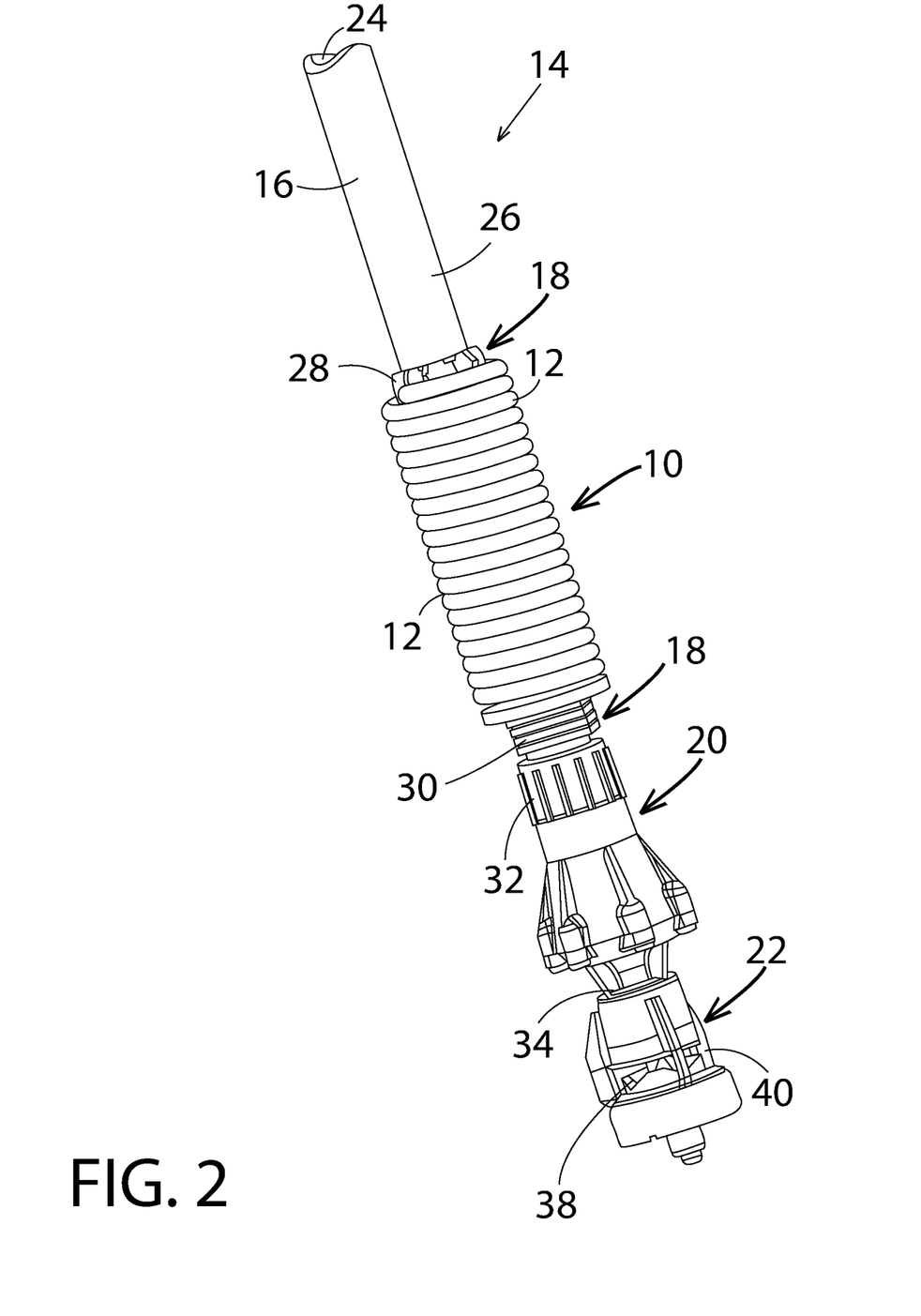
FIG. 2 is a side elevational view of an inverted sprinkler assembly fitted with the elongated coiled weight of FIG. 1.

Referring to FIGS. 2 and 3, an inverted sprinkler assembly is shown, generally illustrated as 14. A tubular drop hose 16 composed of an elastomeric material is illustrated extending from the inverted sprinkler assembly 14. The tubular drop hose 16 is attached to a weight holder 18. The tubular drop hose 16 includes a hose water inlet 24 attached to a water distributing pipeline or water manifold (not shown) and a hose water outlet 26. The hose water outlet 26 is attached to a weight holder water inlet 28 formed on the proximal end of the weight holder 18. The weight holder water inlet 28 includes an insertion end 29 having an outer diameter less than that of the inner diameter of the hose water outlet 26 thereby allowing insertion of the insertion end 29 into the hose water outlet 26 as illustrated in FIG. 3. The weight holder 18 is thereby attached to the tubular drop hose 16 by frictional engagement, although this engagement is also possible by, for example, threading or by adhesive attachment. Typically, this engagement is made with a frictional engagement and hose clamp to secure and/or seal the connection.

The weight holder 18 further includes a weight holder water outlet 30 formed on the distal end of the weight holder 18. Attached to the weight holder water outlet 30 is a pressure regulator water inlet 32 formed on the proximal end of the pressure regulator 20. The attachment of the pressure regulator 20 to the weight holder 18 may be made by the joining of threads as illustrated although it is to be understood that the pressure regulator 20 may be joined to the weight holder 18 by, for example, frictional engagement or adhesive attachment.

The pressure regulator 20 further includes a pressure regulator water outlet 34 formed on its distal end. The pressure regulator 20 is of the flow-through variety of the type illustrated in U.S. Pat. No. 7,048,001, issued on May 23, 2006, for PRESSURE REGULATOR WITH SINGLE STRUT REGULATOR SEAT, assigned to the assignee of the present disclosed inventive concept.

The sprinkler 22 includes a water inlet 36 that is attached to the pressure regulator water outlet 34. The sprinkler 22 may be of any type such as the illustrated having a rotatable water distributor plate 38 rotatably mounted within a water distributor plate housing 40.

The weight holder 18, illustrated in section view in FIG. 3 and in perspective view in FIG. 4 as an isolated component, includes an elongated tubular core 42 and a coiled weight support structure in the form of an annular coiled weight supporting shoulder 44 radially formed proximate its weight holder water outlet 30. The lowermost end of the elongated coiled weight 10 may rest against the annular coiled weight supporting shoulder 44. Formed axially along the elongated tubular core 42 is a series of axial ribs 46. The axial ribs 46 provide a proper and fixed spacing between the inner surface of the elongated coiled weight 10 and the elongated tubular core 42.

While FIGS. 1 through 4 illustrate an elongated coiled weight, it is to be understood that coiled weights having other shapes may also be used in conjunction with the inverted sprinkler assembly according to the disclosed inventive concept. A beehive-shaped coiled weight 50 is shown in FIG. 5. The beehive-shaped coiled weight 50 includes a plurality of individual windings 52. A greater or lesser number of windings 52 may be provided. A narrow top loop 53 is provided at the narrowest end of the beehive-shaped coiled weight 50.

The thickness and shape of the wire that is coiled into the shape of the beehive-shaped coiled weight 50 may be other than that shown. For example, and similar to the elongated coiled weight 10 discussed above and illustrated in FIGS. 1 through 3, the wire of the beehive-shaped coiled weight 50 may have the shape of an oval or a quadrilateral in cross section. The beehive-shaped coiled weight 50 may be composed of any of a variety of materials including, but not limited to steel or a relatively heavy rigid plastic. Like the elongated coiled weight 10, the beehive-shaped coiled weight 50 may be uncoated or may be coated with, for example, paint or a powder coat.

Referring to FIGS. 6 and 7, an inverted sprinkler assembly is shown, generally illustrated as 54. The inverted sprinkler assembly 54 includes the beehive-shaped coiled weight 50. A tubular drop hose 56 composed of an elastomeric material is illustrated extending from the inverted sprinkler assembly 54. The inverted sprinkler assembly 54 further includes a pressure regulator 58 and a sprinkler 60. A non-limiting example of a pressure regulator suited for this purpose is illustrated in U.S. Pat. No. 9,367,070, issued on Jun. 14, 2016, for PRESSURE REGULATOR HAVING SINGLE STRUT SEAT WITH STRUT COAXIAL TO PLUNGER and assigned to the assignee of the present disclosed inventive concept.

The tubular drop hose 56 includes a hose water inlet 62 attached to a water distributing pipeline or water manifold (not shown) and a hose water outlet 64. The hose water outlet 64 is attached to a pressure regulator water inlet 66 formed on the proximal end of the pressure regulator 58 which is of the flow-through variety. The hose water outlet 64 may be attached to the pressure regulator water inlet 66 by any of a variety of methods of attachment including, for example, threading, frictional engagement, or by adhesive.

The pressure regulator 58 includes a pressure regulator water outlet 68. The sprinkler 60 includes a water inlet 70 that is attached to the pressure regulator water outlet 68. The sprinkler 60 may be of any type such as the illustrated having a rotatable water distributor plate 72 rotatably mounted within a water distributor plate housing 74. The water emitting device can be a rotating sprinkler, a spinning sprinkler, a fixed non-moving sprinkler, an orbiting sprinkler, a bubbler, a hose drag fitting, or any other water emitting device.

Formed as part of the pressure regulator water inlet 66 is a coiled weight support structure in the form of a coiled weight support collar 76. The coiled weight support collar 76 includes spaced apart coiled weight support flanges 78. As illustrated in FIG. 7, the narrow top loop 53 of the beehive-shaped coiled weight 50 rests against the spaced apart coiled weight support flanges 78.

FIGS. 8 and 9 illustrate a pear-shaped coiled weight 100 having a narrow end 102 and wide end 103 in position on an inverted sprinkler assembly, generally illustrated as 104. The pear-shaped coiled weight 100 is formed from a plurality of individual windings 105.

Like the elongated coiled weight 10 and the beehive-shaped coiled weight 50 discussed above and illustrated in the accompanying figures, the thickness and shape of the wire that is coiled into the shape of the pear-shaped coiled weight 100 may be other than that shown. For example, and similar to the elongated coiled weight 10 and the beehive-shaped coiled weight 50, the wire of the pear-shaped coiled weight 100 may have the shape of an oval or a quadrilateral in cross section. The pear-shaped coiled weight 100 may be composed of any of a variety of materials including, but not limited to steel or a relatively heavy rigid plastic. Like the elongated coiled weight 10 and the beehive-shaped coiled weight 50, the pear-shaped coiled weight 100 may be uncoated or may be coated with, for example, paint or a powder coat.

The inverted sprinkler assembly 104 includes a tubular drop hose 106 composed of an elastomeric material. The tubular drop hose 106 extends from the inverted sprinkler assembly 104. The inverted sprinkler assembly 104 further includes a fitting 109, a pressure regulator 110 and a sprinkler 112.

The tubular drop hose 106 includes a hose water inlet 114 attached to a water distributing pipeline or water manifold (not shown) and a hose water outlet 116. The fitting 109 includes an insertion end 118 having an outer diameter less than that of the inner diameter of the hose water inlet 114 thereby allowing insertion of the insertion end 118 into the hose water outlet 116 as illustrated in FIG. 9. The fitting 109 is thereby attached to the tubular drop hose 106 by frictional engagement, although this engagement is also possible by, for example, threading or by adhesive attachment.

The fitting 109 includes an intermediate water pipe outlet 120. The intermediate water pipe outlet 120 is attached, preferably though not absolutely by threading, to a pressure regulator water inlet 122 formed on the proximal end of the pressure regulator 110 which is of the flow-through variety. As an alternative to threading, the intermediate water pipe outlet 120 may be attached to the pressure regulator water inlet 122 by frictional engagement or by an adhesive.

The pressure regulator 110 may also be of the flow-through variety of the type illustrated in U.S. Pat. No. 7,048,001, issued on May 23, 2006, for PRESSURE REGULATOR WITH SINGLE STRUT REGULATOR SEAT, assigned to the assignee of the present disclosed inventive concept.

The pressure regulator 110 further includes a pressure regulator water outlet 124 formed on its distal end. The sprinkler 112 includes a water inlet 126 that is attached to the pressure regulator water outlet 124. The sprinkler 112 may be of any type such as the illustrated having a rotatable water distributor plate 128 rotatably mounted within a water distributor plate housing 130.

As illustrated in FIG. 9, the pressure regulator 110 includes a flared housing 132. The shape of the pear-shaped coiled weight 100 conforms to the flared housing 132 and thus is adapted to relatively snugly fit the flared housing 132.

The figures illustrate the coiled weights being singly fitted to their respective inverted sprinkler assemblies. However, it is to be understood that the coiled weights may be used in combination. For example, an elongated coiled weight may be used in conjunction with a beehive-shaped weight or with a pear-shaped weight as the case may be. Accordingly, the figures are not intended to limit the application of the coiled weight of the disclosed inventive concept.

FIGS. 10 and 11 illustrate a variant of the inverted sprinkler assembly 14 of FIGS. 2 through 4 but without the pressure regulator. The variant, generally illustrated as an inverted sprinkler assembly 140, includes a sprinkler portion 142 and an elongated coiled weight 144. The elongated coiled weight 144 is formed from a plurality of individual windings 146 including a lowermost winding 148.

Like the elongated coiled weight 10, the beehive-shaped coiled weight 50, and the pear-shaped coiled weight 100 discussed above and illustrated in the accompanying figures, the thickness and shape of the wire that is coiled into the shape of the elongated coiled weight 144 may be other than that shown. For example, and similar to the elongated coiled weight 10, the beehive-shaped coiled weight 50, and the pear-shaped coiled weight 100, the wire of the elongated coiled weight 144 may have the shape of an oval or a quadrilateral in cross section. The elongated coiled weight 144 may be composed of any of a variety of materials including, but not limited to steel or a relatively heavy rigid plastic. Like the elongated coiled weight 10, the beehive-shaped coiled weight 50, and the pear-shaped coiled weight 100, the elongated coiled weight 144 may be uncoated or may be coated with, for example, paint or a powder coat.

The inverted sprinkler assembly 140 includes a tubular drop hose 150 composed of an elastomeric material. The tubular drop hose 150 extends from the inverted sprinkler assembly 140. The inverted sprinkler assembly 140 further includes a hose-to-sprinkler fitting 152 having a nozzle 154 formed thereon.

Attached to the hose-to-sprinkler fitting 152 is a sprinkler assembly 156 that includes a sprinkler body 157. A spray plate 158 is included in the sprinkler body 157. The spray plate 158 is preferably though not absolutely fixed against rotation relative to the sprinkler body 157.

The tubular drop hose 150 includes a hose water inlet 159 attached to a water distributing pipeline or water manifold (not shown) and a hose water outlet 160. The hose-to-sprinkler fitting 152 includes a neck 162 that is attached to the hose water outlet 160 of the tubular drop hose 150. The neck 162 has an outer diameter less than that of the inner diameter of the hose water outlet 160 thereby allowing insertion of the neck 162 into the hose water outlet 160 as illustrated in FIG. 11.

The neck 162 is thus attached to the tubular drop hose 150 by frictional engagement. To assure proper attachment, the neck 162 may additionally be fixedly secured to the hose water outlet 160 by a variety of means including, but not limited to, the illustrated hose clamp or collar 164. The lowermost winding 148 of the elongated coiled weight 144 rests on a coiled weight support structure in the form of a structure incorporated into the sprinkler portion 142, such as the hose clamp or collar 164 as shown in FIGS. 10 and 11.

The figures illustrate the coiled weights being singly fitted to their respective inverted sprinkler assemblies. However, it is to be understood that the coiled weights may be used in combination. For example, an elongated coiled weight may be used in conjunction with a beehive-shaped weight or with a pear-shaped weight as the case may be. Accordingly, the figures are not intended to limit the application of the coiled weight of the disclosed inventive concept.

One skilled in the art will readily recognize from such discussion, and from the accompanying drawings and claims that various changes, modifications and variations can be made therein without departing from the true spirit and fair scope of the invention as defined by the following claims.

What is claimed is:

1. A weighted inverted sprinkler assembly for use with an irrigation drop hose, the weighted inverted sprinkler assembly comprising:
    a coiled weight formed from a coiled wire, said coiled weight comprising individual windings;
    a sprinkler assembly coupled to the irrigation drop hose so as to allow fluid flow therethrough; and
    a coiled weight support structure coupled to said weighted inverted sprinkler assembly, for supporting and positioning said coiled weight on said weighted inverted sprinkler assembly, said coiled weight support structure comprising an elongated tubular core having a weight supporting shoulder extending radially outward from said elongate tubular core,
    wherein said elongated tubular core of said coiled weight support structure is positioned to be radially aligned within an entire length of the coiled weight,
    wherein the coiled weight is prevented from moving vertically downward with respect to the coiled weight support structure by having one end of the coiled weight touch the weight supporting shoulder of the coiled weight support structure to prevent the coiled weight from moving vertically downward with respect to the weight supporting shoulder, and another end of the coiled weight not touching the coiled weight support structure in a manner that restricts vertical movement, so that said coiled weight is not compressed during use of the weighted inverted sprinkler assembly,
    wherein an end of the elongated tubular core that extends beyond the coiled weight is configured to be coupled to an end of an irrigation drip hose and the coiled weight does not extend beyond the elongated tubular core.

2. The weighted inverted sprinkler assembly of claim 1, wherein said coiled weight has a shape, said shape being selected from the group consisting of an elongated shape, a beehive shape, and a pear shape.

3. The weighted inverted sprinkler assembly of claim 1, further including a pressure regulator fluidly associated with the irrigation drop hose and said weighted inverted sprinkler assembly.

4. The weighted inverted sprinkler assembly of claim 1, wherein said coiled weight comprises multiple loops and wherein at least one of said loops is positioned against said coiled weight support structure.

5. The weighted inverted sprinkler assembly of claim 1, wherein said weight holder further includes a plurality of axial ribs formed on said elongated tubular core.

6. A weight in combination with an inverted sprinkler assembly suspended from a drop hose, the assembly including a weight support structure, the weight comprising:
- a coiled body comprised of a plurality of individual coil windings, said coiled body including at least a plurality of individual coil windings that encircle at least a portion of the weight support structure,
- the weight support structure comprising an elongated tubular core having a weight supporting shoulder extending radially outward therefrom, wherein when the coiled body is supported on the weight support structure, the elongated tubular core of the weight support structure is positioned to be radially aligned within an entire length of the coiled body and the coiled body is prevented from moving vertically downward with respect to the weight support structure by having one end of the coiled body touch the weight support structure, and another end of the coiled body not touching the coiled weight support structure in a manner that restricts vertical movement, so that the coiled body is not compressed during use of the sprinkler assembly,
- wherein an end of the elongated tubular core that extends beyond the coiled body is configured to be coupled to an end of an irrigation drip hose and the coiled body does not extend beyond the elongated tubular core.

7. The weight in combination with an inverted sprinkler assembly of claim 6, wherein said coiled body has a shape, said shape being an elongated shape.

8. The weight in combination with an inverted sprinkler assembly of claim 6, wherein said coiled wire is uncoated.

9. The weight in combination with an inverted sprinkler assembly of claim 6, wherein said coiled wire includes a coating selected from the group consisting of a paint and a powder coat.

10. The weight in combination with an inverted sprinkler assembly of claim 6, wherein said coiled wire is steel.

11. A weighted inverted sprinkler assembly for use with an irrigation drop hose, the assembly comprising:
- a coiled weight having a shape, said shape being selected from the group consisting of an elongated shape, a beehive shape, and a pear shape;
- a sprinkler coupled to the irrigation drop hose so as to allow fluid flow therethrough; and
- a coiled weight support structure having a long axis and a water passageway axially formed therethrough, said coiled weight support structure comprising an elongated tubular core having a weight supporting shoulder extending radially outward from the elongated tubular core,
- wherein said elongated tubular core of the coiled weight support structure is positioned to be radially aligned within an entire length of the coiled weight, and
- wherein the coiled weight is prevented from moving vertically downward with respect to the coiled weight support structure by having one end of the coiled weight touch the weight supporting shoulder of the coiled weight support structure to prevent the coiled weight from moving vertically downward with respect to the weight supporting shoulder, and another end of the coiled weight not touching the coiled weight support structure in a manner that restricts vertical movement, so that said coiled weight is not compressed during use of the sprinkler assembly,
- wherein an end of the elongated tubular core that extends beyond the coiled weight is configured to be coupled to an end of an irrigation drip hose and the coiled weight does not extend beyond the elongated tubular core.

12. The weighted inverted sprinkler assembly of claim 11, further including a pressure regulator fluidly associated with the irrigation drop hose and said sprinkler.

* * * * *

UNITED STATES PATENT AND TRADEMARK OFFICE
CERTIFICATE OF CORRECTION

PATENT NO. : 11,376,621 B2
APPLICATION NO. : 15/953728
DATED : July 5, 2022
INVENTOR(S) : Sean M. Scott, Riley D. Greenwood and Craig B. Nelson It is certified that error appears in the above-identified patent and that said Letters Patent is hereby corrected as shown below:

In the Claims

In Claim 1, at Line 41:
Delete "said elongate tubular core" and substitute therefore --said elongated tubular core--.

Signed and Sealed this
Twenty-ninth Day of November, 2022

Katherine Kelly Vidal
Director of the United States Patent and Trademark Office